United States Patent
Jung et al.

(10) Patent No.: US 7,303,837 B2
(45) Date of Patent: Dec. 4, 2007

(54) POSITIVE ELECTRODE FOR LITHIUM-SULFUR BATTERY AND LITHIUM-SULFUR BATTERY AND ARTICLE OF MANUFACTURE INCLUDING SAME

(75) Inventors: YongJu Jung, Suwon (KR); Seok Kim, Incheon (KR); YunSuk Choi, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 207 days.

(21) Appl. No.: 10/370,772

(22) Filed: Feb. 24, 2003

(65) Prior Publication Data

US 2004/0048154 A1    Mar. 11, 2004

(30) Foreign Application Priority Data

Sep. 11, 2002    (KR) .................. 10-2002-0054951

(51) Int. Cl.
*H01M 4/62* (2006.01)
*H01M 4/60* (2006.01)
*H01M 4/58* (2006.01)

(52) U.S. Cl. .............. 429/217; 429/212; 429/213; 429/218.1; 429/231.95

(58) Field of Classification Search ............. 429/212, 429/213, 217, 218.1
See application file for complete search history.

(56) References Cited

U.S. PATENT DOCUMENTS

| | | | |
|---|---|---|---|
| 4,302,520 A | 11/1981 | Evans et al. | |
| 5,496,662 A | 3/1996 | Andrieu et al. | |
| 5,648,186 A | 7/1997 | Daroux et al. | |
| 6,576,370 B1 * | 6/2003 | Nakagiri et al. | ....... 429/231.95 |
| 6,652,440 B1 * | 11/2003 | Kovalev et al. | ............ 525/279 |
| 2002/0061441 A1 | 5/2002 | Ogura et al. | |

FOREIGN PATENT DOCUMENTS

| | | |
|---|---|---|
| EP | 0 497 303 | 1/1992 |
| EP | 0 497 308 A2 | 1/1992 |
| FR | 2552093 | 3/1985 |
| JP | 06-150910 | 5/1994 |
| JP | 06-150932 | 5/1994 |
| JP | 10-188991 | 7/1998 |
| JP | 11-111279 | 4/1999 |
| JP | 11-154514 | 6/1999 |
| JP | 11-297328 | 10/1999 |
| JP | 11-297329 | 10/1999 |
| KR | 2002-0004054 | 1/2002 |
| KR | 2002-39823 | 5/2002 |

* cited by examiner

*Primary Examiner*—Patrick Joseph Ryan
*Assistant Examiner*—Thomas H. Parsons
(74) *Attorney, Agent, or Firm*—Stein, McEwen & Bui, LLP

(57) ABSTRACT

A positive electrode for a lithium-sulfur battery and a lithium-sulfur battery including the same have a positive electrode that includes a positive active material, a conductor, an organic binder, and an additive. The positive active material includes at least one selected from elemental sulfur, a sulfur-based compound, or a mixture thereof. The additive includes a polymer having at least one amino nitrogen group in main chains or side chains.

15 Claims, 2 Drawing Sheets

POSITIVE ELECTRODE FOR LITHIUM-SULFUR BATTERY AND LITHIUM-SULFUR BATTERY AND ARTICLE OF MANUFACTURE INCLUDING SAME

CROSS-REFERENCE TO RELATED APPLICATIONS

This application claims the benefit of Korean Application No. 2002-54951, filed Sep. 11, 2002, in the Korean Intellectual Property Office, the disclosure of which is incorporated herein by reference.

BACKGROUND OF THE INVENTION

1. Field of the Invention

The present invention relates to a positive electrode for a lithium-sulfur battery and a lithium-sulfur battery and article of manufacture including the same, and more particularly, to a positive electrode for a lithium-sulfur battery providing a lithium-sulfur battery with a high capacity.

2. Description of the Related Art

The recent trend toward more compact and lighter portable electronic equipment has increased a need for a high performance and high capacity battery to provide electric power for portable electronic equipment. The low equivalent weight of lithium renders lithium attractive as a battery electrode component for improving weight ratios. The low equivalent weight and low cost, as well as the nontoxicity of sulfur, also renders sulfur an attractive candidate for a battery component.

A lithium-sulfur secondary battery uses a sulfur-based compound with sulfur-sulfur bonds as a positive active material, and lithium metal or a carbon-based compound as a negative active material. The carbon-based compound in which intercalation chemistry occurs, includes graphite, graphite intercalation compounds, carbonaceous materials, and carbonaceous materials inserted with lithium. Upon discharge (electrochemical reduction), sulfur-sulfur bond breaking occurs, resulting in a decrease in the oxidation number of S, and upon recharging (electrochemical oxidation), a sulfur-sulfur bond formation occurs, leading to an increase in the oxidation number of S.

However, employing a positive electrode based on elemental sulfur in an alkali metal-sulfur battery system has been considered problematic. Although theoretically the reduction of sulfur to an alkali metal-sulfide confers a large specific energy, sulfur is known to be an excellent insulator, and problems using sulfur as an electrode have been noted. Common problems referred to by those skilled in the art include very low percentages of utilization and a low lifecycle characteristic as a result of the sulfur and lithium sulfide ($Li_2S$) dissolved and diffused from the positive electrode.

One scheme to address such problems is the choice of a binder. The requirements for the binder include: an ability to enhance the mechanical integrity of the positive electrode, no reaction with an electrolyte, stability at battery working temperatures, solubility in organic solvents used in slurry, and insolubility in electrolytes.

Examples of conventional binders that satisfy these requirements are polyethylene oxide or polyvinyl pyrrolidone. However, polyethylene oxide has poor adhesion, and polyvinyl pyrrolidone has somewhat poor adhesion. Such poor adhesion necessitates the use of a large amount of binder, which results in a decrease in the amount of positive active material in the positive electrode, causing a decreased capacity.

SUMMARY OF THE INVENTION

It is an aspect of the present invention to provide a positive electrode for a lithium-sulfur battery that includes an additive which can enhance adhesion and decrease the amount of a binder.

It is another aspect to provide a positive electrode for a lithium-sulfur battery exhibiting high capacity.

Additional aspects and advantages of the invention will be set forth in part in the description which follows, and in part will be obvious from the description, or may be learned by practice of the invention.

These and/or other aspects may be achieved by a positive electrode for a lithium-sulfur battery that includes a positive active material, a conductor, an organic binder and an additive.

One aspect of the present invention is a positive active material that is at least one selected from the group consisting of elemental sulfur, a sulfur-based compound, and a mixture thereof.

According to a further aspect of the present invention, an additive includes a polymer with at least one amino nitrogen group in main chains or side chains.

In order to achieve these and/or other aspects, the present invention provides a lithium-sulfur battery including the positive electrode, a negative electrode, and an electrolyte.

According to a still further aspect of the present invention, a negative electrode includes a negative active material selected from a material in which lithium intercalation reversibly occurs, a material which reacts with lithium ions to form a lithium-containing compound, a lithium metal, or a lithium alloy.

BRIEF DESCRIPTION OF THE DRAWINGS

These and other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
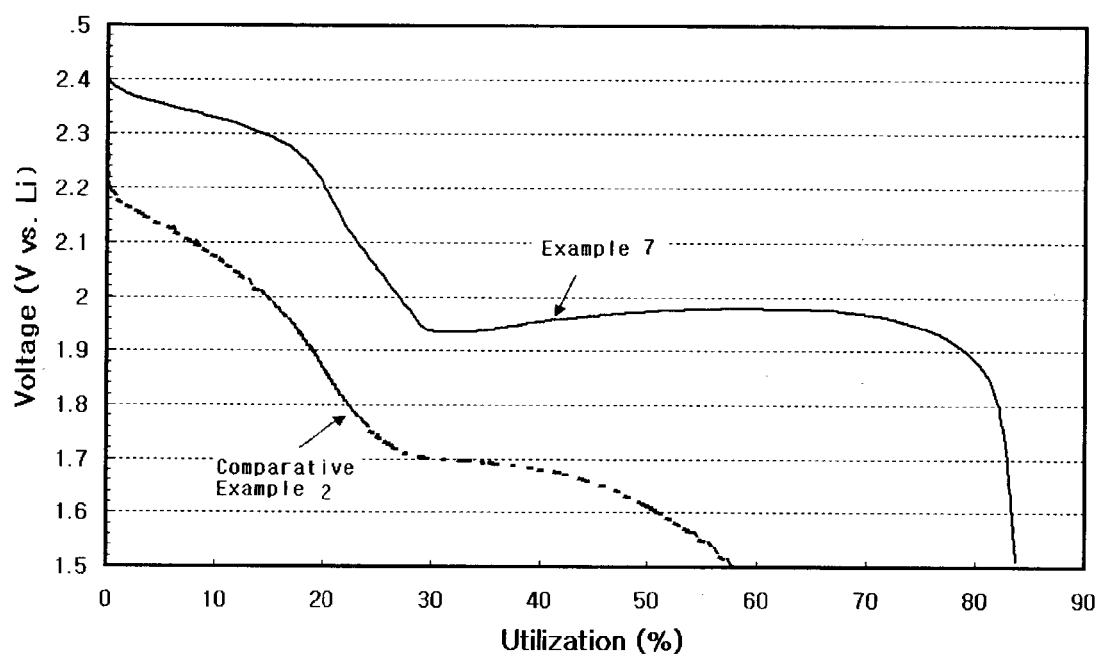
FIG. 1 is a graph showing a discharge curve at a $10^{th}$ charge and discharge cycle of lithium-sulfur batteries according to Example 7 of the present invention and Comparative Example 2.

Reference will now be made in detail to the present embodiments of the present invention, examples of which are illustrated in the accompanying drawings and described in specific Examples, wherein like reference numerals refer to like elements throughout. The embodiments are described below in order to explain the present invention with reference to the figures.

The present invention relates to an additive used in a positive electrode of a lithium-sulfur battery. The additive physically and chemically interacts with a binder to enhance adhesion of the binder. Alternatively, the additive acts as an anchoring agent. The additive is a water-soluble polymer with a high polarity. The polymer has at least one amino nitrogen group in backbones or side chains and is cationic or anionic. Polyethyleneimine is an example of an additive.

Polyethyleneimine has high cationic density, high polarity, and high reactivity, a weight-average molecular weight of 20,000 to 150,000, and preferably 30,000 to 120,000. Polyethyleneimine is a polymer containing primary, secondary, and tertiary amino nitrogen and is a water soluble polymer. Polyethyleneimine is known to be an adhesion-improving material of water soluble adhesives, for example, polyvinyl alcohol or polyvinylacetate.

The weight-average molecular weight of polyethyleneimine is 20,000 to 150,000. If polyethyleneimine with a weight-average molecular weight of less than 20,000 or more than 150,000 is used as the additive, a suitable viscosity cannot be obtained for a positive active material composition.

The generally-used binders for lithium-sulfur batteries have substantially poor adhesion. The additive of the present invention improves the adhesion of the binders, causing a positive active material and a conductor with nano size to adhere firmly onto a current collector.

The positive electrode of the present invention includes a positive active material, a conductor, a binder, and the additive. The positive active material includes at least one selected from elemental sulfur ($S_8$), a sulfur-based compound, or a mixture thereof. The sulfur-based compound is at least one compound selected from $Li_2S_n$ ($n \geq 1$), $Li_2S_n$ ($n \geq 1$) dissolved in a catholyte, an organo sulfur compound, or a carbon-sulfur polymer (($C_2S_x)_n$: x=2.5 to 50, $n \geq 2$).

The conductor includes an electrical conductor that facilitates the movement of electrons within the positive electrode with the sulfur-based compound. Examples of conductive material for the electrical conductor include, but are not limited to, for example, a graphite-based material, a carbon-based material and a conductive polymer. The graphite-based material includes KS 6 (available from TIMCAL CO.), and the carbon-based material includes SUPER P (available from MMA Co.), ketjen black, denca black, acetylene black, or carbon black. The conductive polymer includes polyaniline, polythiophene, polyacetylene, or polypyrrol, or a combination thereof.

The binder may be polyvinyl pyrrolidone, poly(methyl methacrylate), polyvinylidene fluoride, a copolymer of polyhexafluoropropylene and polyvinylidene fluoride (Trademark: Kynar), polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, or copolymers thereof.

The positive electrode preferably includes 5 to 50 parts by weight of the additive based on 100 parts by weight of the binder, and more preferably 10 to 40 parts by weight of the additive based on 100 parts by weight of the binder. The additive improves adhesion of the binder, allows an amount of the binder in an active mass (consisting of the positive active material, the binder, and the conductor) to decrease from 20 to 7 wt %, and allows an amount of the positive active material to increase from 60 to 85 wt %. Thus, the lithium-sulfur battery exhibits high capacity. If the amount of the additive is less than 5 parts by weight, the adhesion decreases. If the amount of the additive is more than 50 parts by weight, viscosity of the positive active material composition decreases, and insufficient viscosity exists for coating. Also, excess additive prevents an increase in the amount of the positive active material, and hence limits capacity.

The positive electrode may further include at least one metal-included additive. The metal-included additive may include transition metals, Group IIIA elements, Group IVA elements, sulfur compounds thereof, or alloys thereof. The transition metals include Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, Au, and Hg. The Group IIIA elements include Al, Ga, In and Tl. The Group IVA elements include Si, Ge, Sn, and Pb.

The positive electrode of the present invention exhibits high sulfur utilization and average voltage. A positive electrode preparation of the present invention is described below. A binder is dissolved in a solvent to prepare a binder liquid. Any solvent may be used, wherein the solvent is capable of homogeneously dispersing a positive active material, the binder, and a conductor. Useful solvents include methanol, ethanol, propanol, butanol, tetrahydrofurane, water, isopropyl alcohol, and N-methyl pyrrolidone.

An additive which physically and chemically interacts with the binder to improve adhesion of the binder is added to the binder liquid and is mixed for at least 1 day to prepare a binder mixing liquid.

A conductor and a positive active material are added to the binder mixing liquid and are mixed for at least 12 hours to prepare a positive active material composition. The resulting positive active material composition has sufficient viscosity to coat.

The positive active material composition is coated on a current collector and dried to produce a positive electrode. The current collector is not limited to, but is preferably made of, a conductive material, for example, stainless steel, aluminum, copper, or titanium. A preferable current collector is a carbon-coated aluminum current collector. The carbon-coated aluminum current collector adheres readily to the coated layer that includes positive active materials, shows a lower contact resistance, and inhibits corrosion by a polysulfide compared with a bare aluminum current collector.

Figure 3:
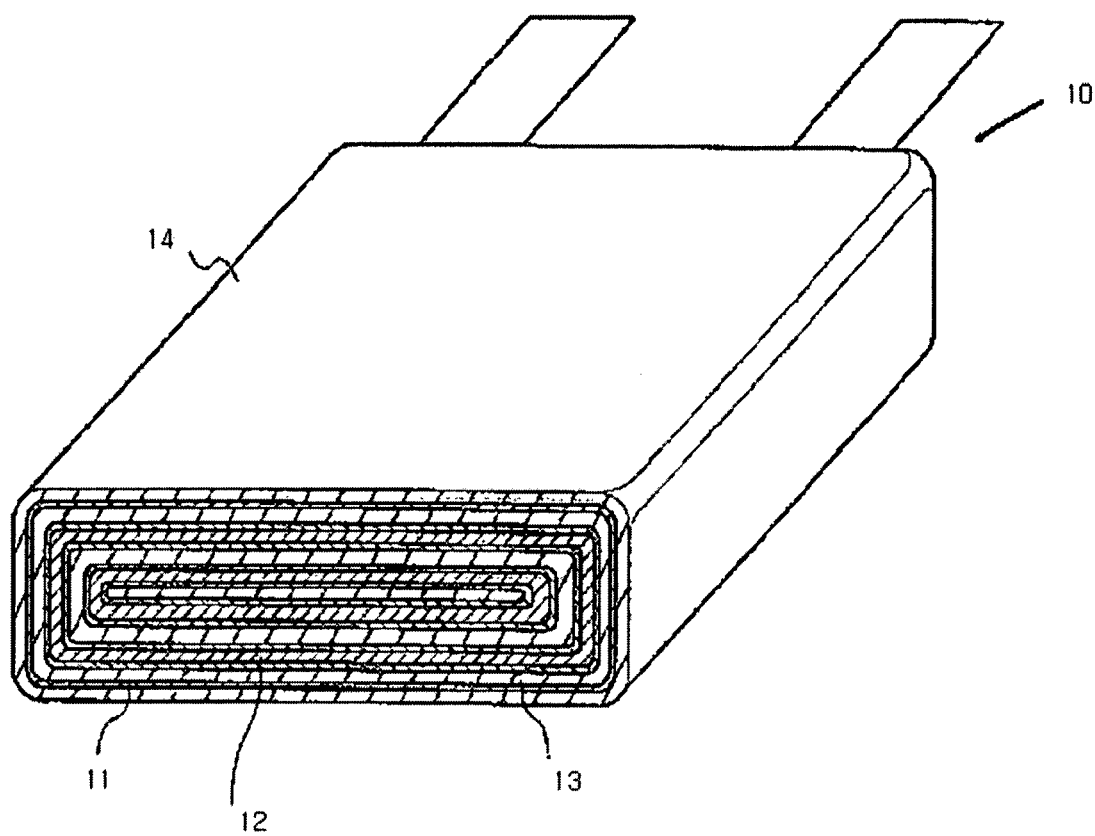
FIG. 3 is a perspective diagram showing a lithium-sulfur battery in accordance with one embodiment of the present invention.

An illustration of a lithium-sulfur battery having a positive electrode produced by the above-mentioned method according to an embodiment of the present invention is shown in FIG. 3. The lithium-sulfur battery 10 includes a case 14 containing the positive electrode 11, a negative electrode 12, and a separator 13 interposed between the positive electrode 11 and the negative electrode 12. An electrolyte is inserted between the positive electrode 11 and the negative electrode 12. However, it is understood that other lithium batteries can be constructed using the positive electrode 11 according to the present invention.

The negative electrode 12 includes a negative active material selected from materials in which lithium intercalation reversibly occurs, a material which reacts with lithium ions to form a lithium-containing compound, a lithium metal or a lithium alloy.

The materials in which lithium intercalation reversibly occurs are carbon-based compounds. Any carbon-based compound capable of intercalating and deintercalating lithium ions may be used. Examples of suitable carbon material include crystalline carbon, amorphous carbon, or a mixture thereof.

Examples of the material which reacts with lithium ions to form a lithium-containing compound are tin oxide ($SnO_2$), titanium nitrate, and Si. The lithium alloy includes an alloy of lithium and a metal selected from Na, K, Rb, Cs, Fr, Be, Mg, Ca, Sr, Ba, Ra, Al, or Sn.

The negative electrode may include an inorganic protective layer, an organic protective layer, or a mixture thereof on a surface of lithium metal. The inorganic protective layer includes Mg, Al, B, C, Sn, Pb, Cd, Si, In, Ga, lithium silicate, lithium borate, lithium phosphate, lithium phosphoronitride, lithium silicosulfide, lithium borosulfide, lithium aluminosulfide, or lithium phosphosulfide. The organic protective layer includes a conductive monomer, oligomer, or polymer selected from poly(p-phenylene), polyacetylene, poly(p-phenylene vinylene), polyaniline, polypyrroloe, polythiophene, poly(2,5-ethylene vinylene), acethylene, poly (perinaphthalene), polyacene, or poly(naphthalene-2,6-diyl).

In addition, during charging and discharging of the lithium-sulfur battery, the positive active material (active sulfur) converts to an inactive material (inactive sulfur), which can be attached to the surface of the negative electrode. The inactive sulfur, as used herein, refers to sulfur that has no activity upon repeated electrochemical and chemical reactions, and thus cannot participate in an electrochemical reaction of the positive electrode. The inactive sulfur on the surface of the negative electrode acts as a protective layer of the lithium negative electrode. Accordingly, inactive sulfur, for example, lithium sulfide, on the surface of the negative electrode can be used in the negative electrode.

The electrolyte includes an electrolytic salt and an organic solvent. The organic solvent may be a sole solvent or a mixed organic solvent with at least two components. The mixed organic solvent includes at least two groups selected from a weak polar solvent group, a strong polar solvent group, or a lithium protection group. Some electrolytes include at least one or more solvents selected from the same group.

The term "weak polar solvent," as used herein, is defined as a solvent which is capable of dissolving elemental sulfur and has a dielectric coefficient of less than 15. The weak polar solvent is selected from aryl compounds, bicyclic ether, or acyclic carbonate compounds. The term "strong polar solvent," as used herein, is defined as a solvent which is capable of dissolving lithium polysulfide and has a dielectric coefficient of more than 15. The strong polar solvent is selected from bicyclic carbonate compounds, sulfoxide compounds, lactone compounds, ketone compounds, ester compounds, sulfate compounds or sulfite compounds. The term "lithium protection solvent," as used herein, is defined as a solvent which forms a suitable protective layer, i.e., a stable solid-electrolyte interface (SEI) layer, on a lithium surface, and which shows a cyclic efficiency of at least 50%. The lithium protection solvent is selected from saturated ether compounds, unsaturated ether compounds, or heterocyclic compounds including N, O and S.

Examples of the weak polar solvents include xylene, dimethoxyethane, 2-methyletrahydrofurane, diethyl carbonate, dimethyl carbonate, toluene, dimethyl ether, diethyl ether, diglym, or tetraglyme. Examples of the strong polar solvents include hexamethyl phosphoric triamide, γ-butyrolactone, acetonitrile, ethylene carbonate, propylene carbonate, N-methyl pyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, or ethylene glycol sulfite.

Examples of the lithium protection solvents include tetrahydrofuran, ethylene oxide, 1,3-dioxolane, 3,5-dimethylisoxazole, 2,5-dimethyl furane,furane, 2-methyl furane, 1,4-oxane, and 4-methyldioxolane. Examples of electrolyte salts which are optional for the battery of this invention include lithium trifluoromethane sulfonimide, lithium triflate, lithium perchlorate, $LiPF_6$, $LiBF_4$, tetraalkylammonium salts such as tetrabutylammonium tetafuloroborate ($TBABF_4$), liquid state salts at room temperature, e.g. imidazolium salt such as 1-ethyl-3-methylimidazolium Bis-(perfluoroethyl sulfonyl) imide (EMIBeti), or a combination thereof.

The following examples illustrate the present invention in further detail, but do not limit the present invention.

EXAMPLE 1

1 g of polyvinyl pyrrolidone was dissolved in 80 g of an isopropyl alcohol organic solvent to prepare a binder liquid. 0.05 g of polyethyleneimine (weight-average molecular weight: 75,000, NIPPON SHOKUBAI CO. Trade mark: P-1050) was added to the binder liquid to prepare a mixed binder liquid. 2 g of carbon black and 16 g of elemental sulfur ($S_8$) were added to the mixed binder liquid and were distributed to prepare a composite slurry for the positive electrode of a lithium-sulfur battery. The slurry was coated on a carbon-coated Al current collector, and the coated collector was dried at room temperature for 10 hours under ambient atmosphere to provide a positive electrode. The loading level of the positive electrode was 2 $mAh/cm^2$.

Using the positive electrode, a lithium negative electrode, and an electrolyte, a lithium-sulfur battery was fabricated. As the electrolyte, 1 M $LiN(CF_3SO_2)_2$ in a mixed solvent of dioxolane, dimethoxyethane, and diglyme (2:4:4 volume ratio) was used.

EXAMPLE 2

A lithium-sulfur battery was fabricated by the same procedure as in Example 1 except that 0.1 g of polyethyleneimine (weight-average molecular weight: 75,000, NIPPON SHOKUBAI CO. P-1050) was added to the binder liquid.

EXAMPLE 3

A lithium-sulfur battery was fabricated by the same procedure as in Example 1 except that 0.2 g of polyethyleneimine (weight-average molecular weight: 75,000, NIPPON SHOKUBAI CO. P-1050) was added to the binder liquid.

EXAMPLE 4

A lithium-sulfur battery was fabricated by the same procedure as in Example 1 except that 0.4 g of polyethyleneimine (weight-average molecular weight: 75,000, NIPPON SHOKUBAI CO. P-1050) was added to the binder liquid.

EXAMPLE 5

1.5 g of polyvinyl pyrrolidone was dissolved in 80 g of isopropylalcohol organic solvent to prepare a binder liquid. 0.075 g of polyethyleneimine (weight-average molecular weight: 75,000, NIPPON SHOKUBAI CO. P-1050) was added to the binder liquid and mixed for at least 1 day to prepare a mixed binder liquid. Using the mixed binder liquid, a lithium-sulfur battery was fabricated by the same procedure as in Example 1.

EXAMPLE 6

A lithium-sulfur battery was fabricated by the same procedure as in Example 5 except that 0.15 g of polyethyleneimine (weight-average molecular weight: 75,000, NIPPON SHOKUBAI CO. P-1050) was added to the binder liquid.

EXAMPLE 7

A lithium-sulfur battery was fabricated by the same procedure as in Example 5 except that 0.3 g of polyethyleneimine (weight-average molecular weight: 75,000, NIPPON SHOKUBAI CO. P-1050) was added to the binder liquid.

COMPARATIVE EXAMPLE 1

1 g of polyvinyl pyrrolidone binder was dissolved in 80 g of an isopropylalcohol organic solvent to prepare a binder liquid. 2 g of carbon black and 16 g of elemental sulfur ($S_8$) were added to the binder liquid and were distributed to prepare a composite slurry for the positive electrode of a lithium-sulfur battery. The slurry was coated on a carbon-coated Al current collector, and the coated collector was dried at room temperature for 10 hours under ambient atmosphere.

Using the positive electrode, a lithium negative electrode, and an electrolyte, a lithium-sulfur battery was fabricated. As the electrolyte, 1 M $LiN(CF_3SO_2)_2$ in a mixed solvent of dioxolane, dimethoxyethane, and diglyme (2:4:4 volume ratio) was used.

COMPARATIVE EXAMPLE 2

2 g of polyvinyl pyrrolidone binder was dissolved in 80 g of an isopropylalcohol organic solvent to prepare a binder liquid. 2 g of carbon black and 16 g of elemental sulfur ($S_8$) were added to the binder liquid and were distributed to prepare a positive active slurry for a lithium-sulfur battery. Using the slurry, a lithium-sulfur battery was fabricated by the same procedure as in Comparative Example 1.

COMPARATIVE EXAMPLE 3

1 g of polyethyleneoxide binder was added to 100 g of water to prepare a binder liquid. 0.05 g of polyethyleneimine (weight-average molecular weight: 75,000, NIPPON SHOKUBAI CO. P-1050) was added to the binder liquid to prepare a mixed binder liquid. The resulting mixed binder liquid was a colloidal suspension which was not suitable as a binder liquid and had no substantial viscosity.

2 g of carbon black and 16 g of elemental sulfur ($S_8$) were added to the binder liquid and were distributed to prepare a positive active material slurry. The slurry had no substantially viscosity and had poor adhesion. The poor adhesion prevented coating the slurry on a current collector, and separation of the coated slurry from the collector occurred.

COMPARATIVE EXAMPLE 4

1 g of a polyvinylalcohol binder was added to 100 g of water to prepare a binder solution. 0.05 g of polyethyleneimine (weight-average molecular weight: 75,000, NIPPON SHOKUBAI CO. P-1050) was added to the binder solution. The resulting mixture was a colloidal suspension which was not suitable as the binder liquid and had no substantial viscosity.

COMPARATIVE EXAMPLE 5

1 g of a polyvinylacetamide binder was dissolved in 100 g of a dimethylformamide organic solvent. 0.05 g of polyethyleneimine (weight-average molecular weight: 75,000, NIPPON SHOKUBAI CO. P-1050) was added to the resulting solution. The resulting material was a colloidal suspension which was not suitable as the binder liquid.

2 g of a polyethyleneimine binder (weight-average molecular weight: 75,000, NIPPON SHOKUBAI CO P-1050) was dissolved in 80 g of an isopropylalcohol organic solvent to prepare a binder liquid. 2 g of carbon black and 16 g of elemental sulfur ($S_8$) were added to the binder liquid and were distributed to prepare a composite slurry for the positive electrode of a lithium-sulfur battery. The slurry had a very low viscosity and poor adhesion.

COMPARATIVE EXAMPLE 6

2.0 g of a polyethyleneimine (weight-average molecular weight: 75,000, NIPPON SHOKUBAI CO. P-1050) binder was dissolved in 80 g of an isopropyl organic solvent to a prepare a binder liquid. 2 g of carbon black and 16 g of elemental sulfur ($S_8$) were added to the binder liquid and were distributed to prepare a composite slurry for the positive electrode of a lithium-sulfur battery. The slurry had a very low viscosity and poor adhesion The lithium-sulfur cells according to Examples 1 to 7 and Comparative Examples 1 and 2 were evaluated using the charge and discharge protocol. The first discharge cycle, the second discharge cycle, the third discharge cycle, the fourth discharge cycle and the fifth discharge cycle, which corresponded to a formation process, were set to constant current densities of 0.2, 0.2, 0.4, 1 and 2 $mA/cm^2$, respectively. The charge current densities were 0.4 $mA/cm^2$. The cut-off voltages at charge and discharge were respectively 2.8 and 1.5 V. When a shuttle phenomenon in which an increase of voltage stopped, occurred, the charge was performed at a 110% charge amount based on the nominal capacity. 100% sulfur utilization was considered to be 837.5 mAh/g of capacity. The initial 1st to 5th cycles were considered to be a formation step. Thus, a substantial charge and discharge cycle result was obtained from the $6^{th}$ cycle, and the lifecycle test was started at the 6th cycle, resulting in the $6^{th}$ cycle being considered to be a cycle $1^{st}$ cycle. In the lifecycle test, the discharge current density was 2 $mA/cm^2$ and the charge current density was 1 $mA/cm^2$.

Electrochemical Properties

Figure 2:
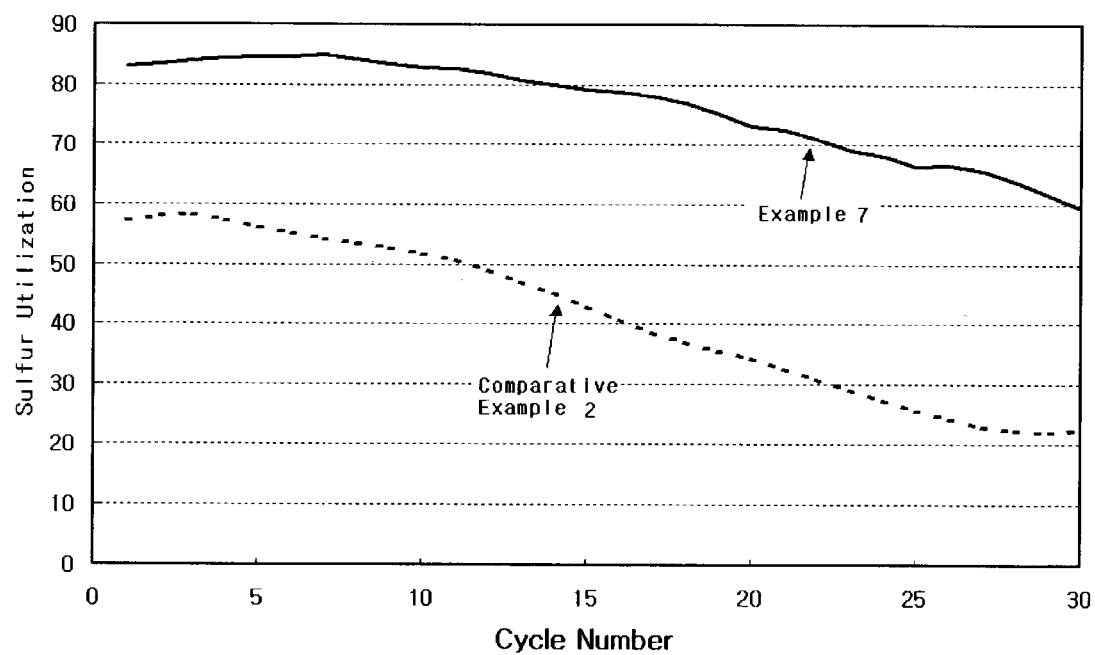
FIG. 2 is a graph showing life cycle characteristics of lithium-sulfur batteries according to Example 7 of the present invention and Comparative Example 2.

The charge and discharge curve and the lifecycle characteristic at the cycle $1^{st}$ cycle (actual $6^{th}$ cycle) of lithium-sulfur cells according to Example 7 and Comparative Example 2 are presented in FIGS. 1 and 2, respectively. As shown in FIG. 1, the cell according to Example 7 with polyethyleneimine exhibited superior sulfur utilization and mid-voltage than the cell according to Comparative Example 2 with polyvinyl pyrrolidone. In addition, FIG. 2 shows that the cell according to Example 7 exhibited a superior lifecycle characteristic compared to the cell according to Comparative Example 2.

Sulfur Utilization

The sulfur utilization (%) and the viscosity of the positive active material slurry of the lithium-sulfur cells according to Examples 1 to 7 were measured, and the results are presented in Table 1. In addition, using the binder liquid used in Examples 1 to 7, binder films were produced. The stability (solubility) of the binder films in the electrolyte was measured, and the results are presented in Table 1.

TABLE 1

|  | Polyvinyl-pyrrolidone (g) | Poly-ethyeleneimine (g) | Sulfur utiliza- tion (%) | Slurry viscosity | Solubility to electrolyte |
|---|---|---|---|---|---|
| Example 1 | 1.0 | 0.05 | 81 | Suitable for coating | Insoluble |
| Example 2 | 1.0 | 0.10 | 82 | Suitable for coating | Insoluble |
| Example 3 | 1.0 | 0.20 | 86 | Suitable for coating | Insoluble |
| Example 4 | 1.0 | 0.40 | 78 | Suitable for coating | Insoluble |
| Example 5 | 1.5 | 0.075 | 80 | Suitable for coating | Insoluble |
| Example 6 | 1.0 | 0.15 | 85 | Superior for coating | Insoluble |
| Example 7 | 1.0 | 0.30 | 84 | Superior for coating | Insoluble |
| Comparative Example 1 | 1.0 | 0 | 58 | Very low for coating | Soluble |
| Comparative Example 2 | 2.0 | 0 | 57 | Very low for coating | Soluble |

Workability

As shown in Table 1, the slurry according to Examples 1 to 7 had a suitable viscosity for roll-coating, but the slurry according to Comparative Examples 1 and 2 had a low viscosity and was unsuitable for use for roll-coating. The slurry according to Examples 6 and 7 in which polyethyleneimine was used in the amount of 15 and 30 parts by weight based on 100 parts by weight of the polyivinylpyrrolidone binder, respectively, had the best viscosity.

Stability in Electrolyte

The binder films produced by using the binder liquid with polyethyleneimine according to Examples 1 to 7 did not dissolve in the electrolyte, but the binder films with polyvinyl pyrrolidone according to Comparative Examples 1 and 2 were slightly dissolved in the electrolyte.

Viscosity According to Molecular Weight of Polyethyleneimine

In order to measure the effect by molecular weight of polyethyleneimine on viscosity, polyethyleneimine with a weight-average molecular weight of 75,000 (NIPPON SHOKUBAI CO., Trade mark: P-1050) and polyethyleneimine with a weight-average molecular weight of 10,000 (NIPPON SHOKUBAI CO., Trade mark: SP-200) were used. The measurement of viscosity was performed by adding various amounts of polyethyleneimine to a polyvinyl pyrrolidone ethanol solution and shaking for 1 day followed by measuring the viscosity of the resulting solution. The weight ratios of polyethyleneimine to polyvinyl pyrrolidone were 5%, 10%, 20% and 50%. The viscosities are presented in Table 2.

TABLE 2

| Polyvinyl-pyrrolidone (concentration %) | Polyethyleneimine with weight-average molecular weight of 10,000 | Polyethyleneimine with weight-average molecular weight of 75,000 | Viscosity (cP) |
|---|---|---|---|
| 5 | 0 | 5 | 14 |
| 5 | 0 | 10 | 25 |
| 5 | 0 | 20 | 55 |
| 5 | 0 | 50 | 120 |
| 5 | 5 | 0 | 4.7 |
| 5 | 10 | 0 | 4.7 |
| 5 | 20 | 0 | 4.7 |
| 5 | 50 | 0 | 4.7 |
| 5 | 0 | 0 | 3.1 |
| 10 | 0 | 0 | 19 |

As the amount of high-molecular weight polyethyleneimine (weight-average molecular weight: 75,000, NIPPON SHOKUBAI CO., Trademark: P-1050) increased, the viscosity increased. But even when the amount of low-molecular weight polyethyleneimine was increased, the low viscosity was maintained. Thus, low-molecular weight polyethyleneimine is not suitable for preparing positive active material compositions due to the need for viscosity.

Chemical Properties of Polyethyleneimine

Polyethyeleneimine interacts with a polyvinylpyrrolidone binder to increase adhesion and viscosity (Examples 1 to 7). Polyethyleneimine, however, does not interact with polyethyleneoxide, polyvinylalcohol, and polyvinylacetate binders, and has adverse effects (Comparative Examples 3 to 5).

The positive electrode of the present invention includes an additive which physically and chemically interacts with a binder to improve the adhesion of the binder. The additive renders a decrease in the amount of the binder and an increase in the utilization of sulfur, increasing a capacity per weight of the active mass. In addition, the positive electrode exhibits an improved lifecycle characteristic.

The lithium-sulfur battery of the present invention may, for example, be utilized to provide power for an article of manufacture, for example, portable electronic equipment. The portable electronic equipment includes, but is not limited to, hand-held devices, including organizers, video games, cellular phones, pagers, electronic toys, and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive electrode for a lithium-sulfur battery comprising:
   a distributed mixture of a positive active material, a conductive agent, an organic binder and polyethyleneimine,
   wherein the positive active material includes at least one selected from the group consisting of elemental sulfur, a sulfur-based compound, and a mixture thereof,
   the polyethyleneimine has a weight-average molecular weight of 30,000 to 120,000 and
   the amount of the polyethyleneimine is 5 to 50 parts by weight based on 100 parts by weight of the binder, and
   the organic binder is selected from the group consisting of polyvinyl pyrrolidone, poly(methyl methacrylate), polyvinylidene fluoride, a copolymer of polyhexafluoropropylene, polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, and copolymers thereof.

2. The positive electrode according to claim 1, wherein the amount of the polyethyleneimine is 10 to 40 parts by weight based on 100 parts by weight of the binder.

3. The positive electrode according to claim 1, wherein the positive active material is elemental sulfur or at least one sulfur-based compound selected from the group consisting of $Li_2S_n(n \geq 1)$, $Li_2S_n(n \geq 1)$ dissolved in catholyte, organosulfur compounds, and carbon-sulfur polymers $((C_2S_x)_n$: x=2.5 to 50, $n \geq 2)$.

4. A lithium-sulfur battery comprising:
a positive electrode comprising a distributed mixture of a positive active material, a conductor, an organic binder and polyethyleneimine, wherein the positive active material includes at least one selected from the group consisting of elemental sulfur, a sulfur-based compound, and a mixture thereof; and the polyethyleneimine has a weight-average molecular weight of 30,000 to 120,000;
a negative electrode comprising a negative electrode selected from the group consisting of a material in which lithium intercalation reversibly occurs, a material which reacts with lithium ions to form a lithium-containing compound, a lithium metal, and a lithium alloy; and
an electrolyte,
wherein the organic binder is selected from the group consisting of polyvinyl pyrrolidone, poly(methyl methacrylate), polyvinylidene fluoride, a copolymer of polyhexafluoropropylene and polyvinylidene fluoride, polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, and copolymers thereof, and
the amount of the polyethyleneimine is 5 to 50 parts by weight based on 100 parts by weight of the binder.

5. The lithium-sulfur battery according to claim 4, wherein the amount of the polyethyleneimine is 10 to 40 parts by weight based on 100 parts by weight of the binder.

6. The lithium-sulfur battery according to claim 4, wherein the positive active material is elemental sulfur or at least one sulfur-based compound selected from the group consisting of $Li_2S_n(n \geq 1)$, $Li_2S_n$ ($n \geq 1$) dissolved in catholyte, organosulfur compounds, and carbon-sulfur polymers $((C_2S_x)_n$: x=2.5 to 50, $n \geq 2)$.

7. A positive electrode for a lithium-sulfur battery comprising:
a distributed mixture of a positive active material, a conductor, a binder and polyethyleneimine,
wherein the positive active material includes at least one selected from the group consisting of elemental sulfur, a sulfur-based compound, and a mixture thereof;
the binder is selected from the group consisting of polyvinyl acetate, polyvinyl alcohol, polyvinyl pyrrolidone, poly(methyl methacrylate), polyvinylidene fluoride, a copolymer of polyhexafluoropropylene and polyvinylidene fluoride, polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, and copolymers thereof; and the polyethyleneimine has a weight-average molecular weight of 30,000 to 120,000, and
the amount of the polyethyleneimine is 5 to 50 parts by weight based on 100 parts by weight of the binder.

8. The positive electrode according to claim 7, wherein the amount of the polyethyleneimine is 10 to 40 parts by weight based on 100 parts by weight of the binder.

9. The positive electrode of claim 7, wherein the positive active material is elemental sulfur or at least one selected from the group consisting of $Li_2S_n(n \geq 1)$, $Li_2S_n$ ($n \geq 1$) dissolved in catholyte, organosulfur compounds, and carbon-sulfur polymers $((C_2S_x)_n$: x=2.5 to 50, $n \geq 2)$.

10. A lithium-sulfur battery comprising:
a positive electrode comprising a distributed mixture of a positive active material, a conductor, a binder and polyethyleneimine,
wherein the positive active material includes at least one selected from the group consisting of elemental sulfur, a sulfur-based compound, and a mixture thereof; the binder is selected from the group consisting of polyvinyl pyrrolidone,poly(methyl methacrylate), polyvinylidene fluoride, a copolymer of polyhexafluoropropylene and polyvinylidene fluoride, polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, and copolymers thereof; and the polyethyleneimine has a weight-average molecular weight of 30,000 to 120,000, the amount of the polyethyleneimine is 5 to 50 parts by weight based on 100 parts by weight of the binder;
a negative electrode comprising a negative active material selected from the group consisting of a material in which lithium intercalation reversibly occurs, a material which reacts with lithium ions to form a lithium-containing compound, a lithium metal and lithium alloy; and
an electrolyte.

11. The lithium-sulfur battery according to claim 10, wherein the amount of the polyethyleneimine is 10 to 40 parts by weight based on 100 parts by weight of the binder.

12. The lithium-sulfur battery according to claim 10, wherein the positive active material is elemental sulfur or at least one selected from the group consisting of $Li_2S_n$ ($n \geq 1$), $Li_2S_n$ ($n \geq 1$) dissolved in catholyte, organosulfur compounds, and carbon-sulfur polymers $((C_2S_x)_n$: x=2.5 to 50, $n \geq 2)$.

13. An article of manufacture comprising portable electronic equipment, wherein power is supplied to the portable electronic equipment by a lithium-sulfur battery, the lithium-sulfur battery comprising:
a positive electrode comprising a distributed mixture of a positive active material, a conductor, a binder and polyethyleneimine,
wherein the positive active material includes at least one selected from the group consisting of elemental sulfur, a sulfur-based compound, and a mixture thereof; the binder is selected from the group consisting of polyvinyl pyrrolidone poly(methyl methacrylate), polyvinylidene fluoride, a copolymer of polyhexafluoropropylene and polyvinylidene fluoride, polyethyl acrylate, polytetrafluoroethylene, polyvinyl chloride, polyacrylonitrile, polycaprolactam, polyethylene terephthalate, polybutadiene, polyisoprene, polyacrylic acid, derivatives thereof, blends thereof, and copolymers thereof;

and the polyethyleneimine has a weight-average molecular weight of 30,000 to 120,000, and the amount of the polyethyleneimine is 5 to 50 parts by weight based on 100 parts by weight of the binder;

a negative electrode comprising a negative active material selected from the group consisting of a material in which lithium intercalation reversibly occurs, a material which reacts with lithium ions to form a lithium-containing compound, a lithium metal and lithium alloy; and an electrolyte.

14. The article of manufacture according to claim 13, wherein the amount of the polyethyleneimine is 10 to 40 parts by weight of the binder.

15. The article of manufacture according to claim 13, wherein the positive active material is elemental sulfur or at least one selected from the group consisting of $Li_2S_n$ ($n \geq 1$), $Li_2S_n$ ($n \geq 1$) dissolved in catholyte, organosulfur compounds, and carbon-sulfur polymers (($C_2S_x)_n$: x=2.5 to 50, $n \geq 2$).

* * * * *